(No Model.)
A. C. KASSON.
BAKE PAN AND STEAMER.
No. 285,905. Patented Oct. 2, 1883.
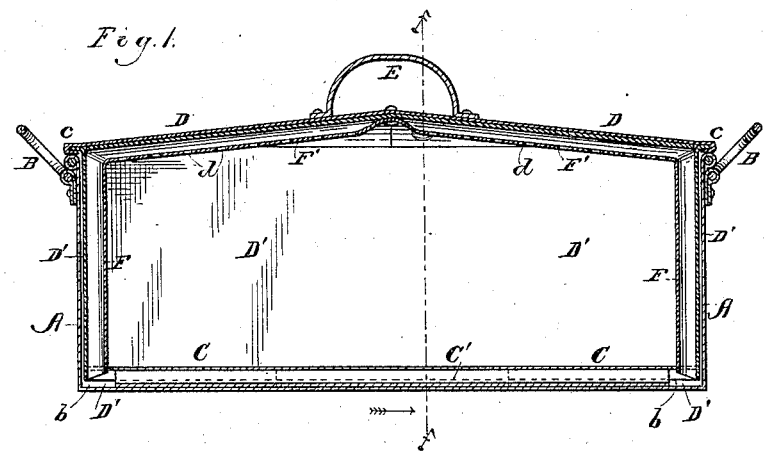
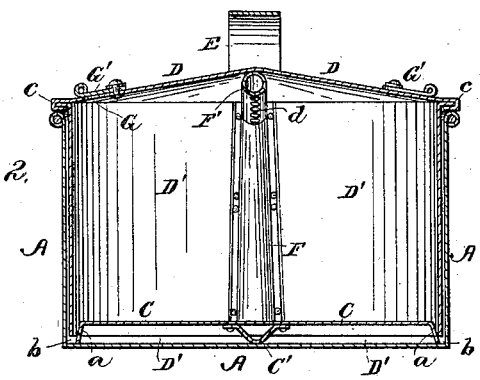
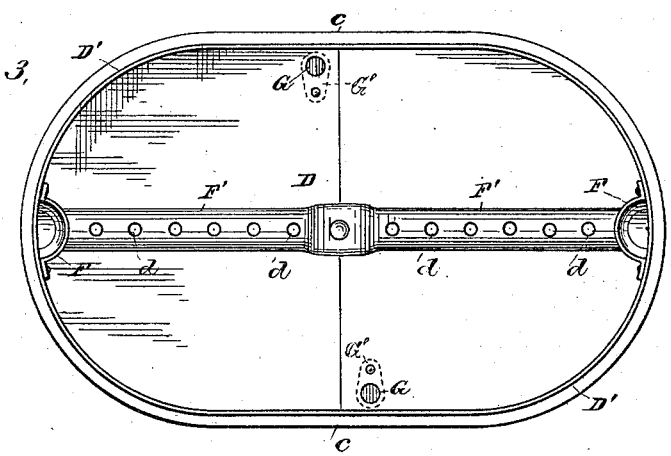
Witnesses
Henry Frankfurter
W. S. Baker
Inventor
Amasa C. Kasson,
per Gridley & Co.
his Attorneys,

# UNITED STATES PATENT OFFICE.

AMASA C. KASSON, OF CHICAGO, ILLINOIS, ASSIGNOR TO THE CHICAGO STAMPING COMPANY, OF SAME PLACE.

BAKE-PAN AND STEAMER.

SPECIFICATION forming part of Letters Patent No. 285,905, dated October 2, 1883.

Application filed June 6, 1883. (No model.)

*To all whom it may concern:*

Be it known that I, AMASA C. KASSON, of Chicago, in the county of Cook and State of Illinois, have invented certain new and useful Improvements in Apparatus for Steaming and Roasting Meats, of which the following, in connection with the accompanying drawings, is a specification.

In the drawings, Figure 1 is a vertical longitudinal central section of a steamer and roaster embodying my invention. Fig. 2 is a section of the same in the plane of the line *x x*, viewed in the direction indicated by the arrow there shown; and Fig. 3 is an inside or interior view of the cover.

Like letters of reference indicate like parts.

A represents the body of the steamer or roaster, which, in the example shown, consists of an oblong and comparatively deep sheet-metal vessel having an open top, but otherwise made close or tight.

B B are lifting rings, ears, or handles applied to the ends of the body A.

C is a false bottom, and *a a* are supporting-flanges on the sides thereof. C' is a support or channel on the bottom of the bottom C. The bottom C is of such a size as to leave between its edges and the sides of the body A a small space, *b*, but in other respects the bottom C is adapted to enter the body A fittingly and removably, and it is supported somewhat above the bottom of the part A by means of the flanges *a a* and the support C'.

D is the top or cover. This cover has a broad or deep depending rim, D', and is flanged, as shown at *c*, to rest upon the upper edge of the body A. The top or cover D D' is fitted neatly into the body A, and is provided with a bail or handle, E, to permit it to be applied or removed with facility. The lower edge of the rim D' enters the space *b*, as is clearly indicated in Figs. 1 and 2.

F F' are conduits passing up the ends and along the top of the cover D D', respectively, on the interior of the said cover, and *d d* are ports or perforations in the parts F F'. The parts F and F' meet and communicate with each other, and the lower ends of the parts F F' are open and enter the space *b*, the ends of the bottom C being cut away for that purpose.

G G are ports in the top of the cover D D', and G' G' are pivoted lids covering the same.

To use this apparatus for the purpose for which it is intended, I remove the top or cover D D', and pour about a pint of water into the body or vessel A. This water will lie below the false bottom C. I then place the meat upon a platter, and set the latter, with the meat thereon, upon the false bottom C. I then apply the top or cover D D', the ports G G being closed. I then place the whole in an oven having a proper temperature or degree of heat. As the water becomes heated steam is generated, and by means of the pressure of the steam the hot water is forced upward through the conduits F F and F' F', and passes out through the ports *d d*, the steam filling the interior of the apparatus, and the water or condensed steam dripping down upon the meat. By this means the meat is steamed, softened, and cooked, and also basted by reason of the dripping of the fluid contents upon it out through the ports *d d*. To brown the meat and roast it, I open the lids or valves G' G', thereby permitting the heated air in the oven to pass directly into the interior of the apparatus described. For simply steaming, softening, and cooking the meat, I leave the lids G' G' closed, and the ports G G are not essential in treating the meat in the manner last above referred to. In other words, neither the ports G G nor their lids or valves are essential, excepting for the purpose of adapting the apparatus to be used both as a steamer and roaster.

Having thus described my invention, what I claim as new, and desire to secure by Letters Patent, is—

1. The combination of the body A, the false bottom C, and the top or cover D D', provided on its inner side with the conduits F F, open at their lower ends, and with the ported or perforated conduits F' F', entering the upper ends of the conduits F F, substantially as and for the purposes specified.

2. The combination of the body or vessel A, the raised false bottom C, the cover or top D D′, having in its top part the ports G G, and provided with the lids or valves G′ G′, the vertical conduits F F, opening at their lower ends, and the conduits F′ F′, having therein the ports or perforations $d\ d$, and entering the upper ends of the conduits F F, all arranged for operation together substantially as and for the purposes set forth.

AMASA C. KASSON.

Witnesses:
N. COWLES,
W. L. BAKER.